Nov. 25, 1952     O. MAISCH     2,619,039
SIRUP MEASURING AND DISPENSING PUMP
Filed April 27, 1948
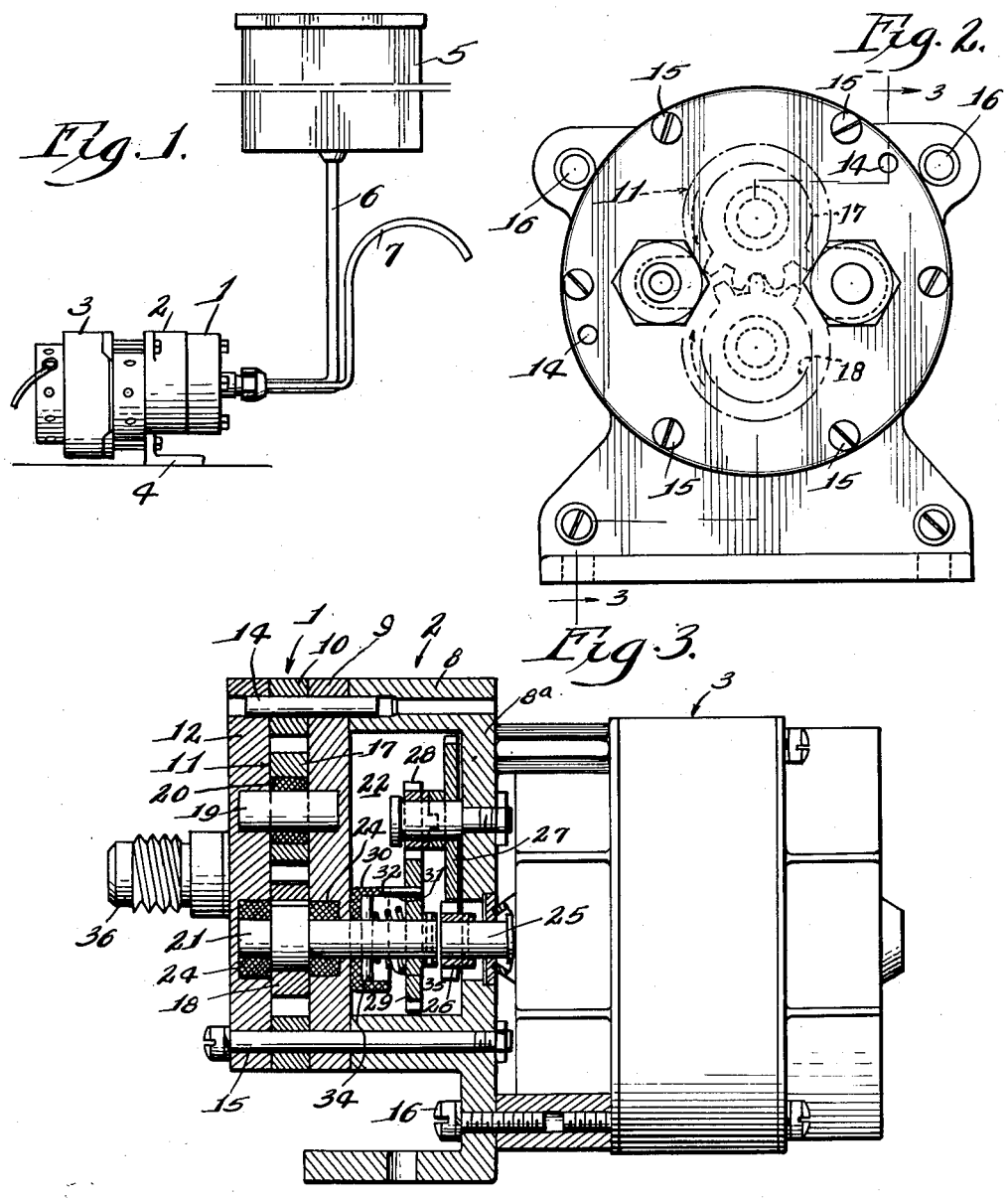

Patented Nov. 25, 1952

2,619,039

UNITED STATES PATENT OFFICE 2,619,039

SIRUP MEASURING AND DISPENSING PUMP

Oliver Maisch, Chicago, Ill.

Application April 27, 1948, Serial No. 23,523

1 Claim. (Cl. 103—126)

In dispensing soft drink syrups, where the flow of syrup depends entirely on gravity, great difficulty is experienced in delivering exact, predetermined quantities of syrup, because the viscosity of syrups and consequently, the rate of flow by gravity, vary with the temperature.

The object of the present invention is to produce a simple and novel apparatus by means of which predetermined, variable quantities of syrup may be accurately measured and dispensed, regardless of the degree of viscosity of the syrup.

In carrying out my invention, I use a small gear pump and, viewed in one of its aspects, my invention may be said to have for its object to produce a simple, novel and compact power-driven pump unit that shall operate efficiently, without danger of contaminating the syrup and without fear of leakage of the syrup into the driving mechanism for the pump.

The various features of novelty whereby the present invention is characterized will hereinafter be pointed out with particularity in the claim; but, for a full understanding of the invention and of its objects and advantages, reference may be had to the following detailed description taken in connection with the accompanying drawing, wherein:

Figure 1 is an elevational view of my improved pumping unit connected with an elevated syrup tank and provided with a dispensing spout; Fig. 2 is an end view of the said unit, on a larger scale; Fig. 3 is a view on the same scale as Fig. 2, showing the motor in side elevation and the pump and speed reducing mechanism in section along irregular line 3—3 of Fig. 2; Fig. 4 is a view, partly in elevation and partly in longitudinal section, of the inlet nipple for the pump; and Fig. 5 is a longitudinal section through the nipple that forms the outlet from the pump chamber.

Referring to Fig. 1 of the drawing, 1 is a gear pump, 2 a casing for speed reducing gearing, and 3 is an electric motor; all of these members being bolted together into a single unit that is supported by a base 4 forming part of the housing for the speed reducer and adapted to be secured to any suitable support. Syrup is supplied to the pump from an elevated tank 5 through a pipe 6, and is discharged from the pump through a smaller pipe 7.

The casings or housings for the pump and speed reducing gears are preferably in the form of a single cylindrical unit that comprises: a cup-shaped member 8, the open end of which is closed by a disc-like partition wall 9; a disc 10 cut out in the center to form the usual pump chamber 11; and a third disc 12 between which and disc 9 disc 10 lies. These four parts may be accurately aligned by dowel pins 14 of which two are shown; and they are clamped together by through bolts 15. Other bolts or screws 16, fasten the motor to member 2. Parts 8, 9, 10 and 12 are made of stainless steel.

Within the pump chamber are two stainless steel gears 17 and 18 that mesh with each other. As is the case with gear pumps, the wheels are a close fit between discs 9 and 12. Wheel 17 is supported by a short, stationary shaft 19 that extends through the same and into discs 9 and 12. Surrounding that part of this shaft corresponding to the thickness of the gear wheel and engaging with discs 9 and 12, is a graphite bearing sleeve 20. Pump gear 18 is fixed on a shaft 21, one end of which extends part way through disc 12 and all the way through and well beyond disc 9 into the chamber 22 of the speed reducer. Shaft 21 runs in graphite bearings 24, 24, similar to bearing 20, but located in discs 9 and 12 and engaging with the sides of gear 18.

A shaft 25 extends from the motor into chamber 22 through the bottom wall 8ª of the cup which also forms one end wall of the cylindrical housing or casing of which disc 12 forms the other end wall. On this shaft, within chamber 22, is fixed a pinion 26 which meshes with an idler gear wheel 27. Coaxial with gear wheel 27 and connected thereto so as to be driven thereby, is a pinion 28. Pinion 28 meshes with a gear wheel 29 fixed on the protruding end of pump shaft 21. So, when the motor is running, it drives the pump gears.

Care must be taken that oil from the speed reducer does not seep into the pump chamber and that no syrup leaks into the speed reducer chamber. To this end I have provided a novel seal around the pump shaft; the same consisting of a cup-shaped washer 30 of graphite surrounding the shaft and held so that it may slide lengthwise of the latter but cannot rotate thereon. In the arrangement shown a pin 31, fixed to gear wheel 29, projects into a notch 32 in the rim of member 30. Within the cup is a disc 34 of buna rubber. Surrounding the pump shaft and pressing at one end against disc 34 and at its other end engaging the near flat face of gear wheel 29, is a compression spring 35. Cup 30 is therefore compelled to revolve with the pump shaft and no wear takes place between the latter, the cup and the rubber disc. On the other hand the flat bottom of the graphite cup is at all times yieldingly held against the wall through which the pump shaft projects; thus avoiding end play and providing contact between flat surfaces of relatively large areas that rub against each other and make it impossible for fluids to pass in either direction between the same.

The inlet for syrup into the pump chamber is through a nipple 36 having a bore 37 of considerable diameter and, if desired, containing a filter or strainer 38. The discharge from the pump chamber is through a nipple 39, the bore in which is much smaller than that in the other nipple. Also, there is in the outlet nipple a check valve in the form of a ball 40, that seats toward the inlet end and is held in closed position by a compression spring 41, except when the pump is forcing syrup toward and through the nipple.

I have found that the use of stainless steel and graphite in the pump leaves the syrup in a pure state and that, additionally, such bearings are very efficient and long lasting. Also, the novel sealing means for the main pump shaft, with which it rotates, creates a perfect seal and lasts indefinitely because the bottom wall of the cup-shaped graphite washer may be made sufficiently thick to take care of all wear that may take place during an indefinite period of time.

By providing a large pump inlet and supply conduit therefor, the pump will always be supplied with enough syrup to meet the demand, no matter how sluggish the flow by gravity may be.

In actual use, the operation of the motor is controlled by a time switch (not shown); so that, upon pressing a button, the pump is caused to run for any predetermined period of time and then stop; the quantity of syrup being dispensed during any such running period being exactly proportional to the length of the latter.

The speed of the pump should be such that the syrup is expelled at a rate which causes a thorough mixture of the usual carbonated water therewith upon entering the beverage receiving receptacle.

In the foregoing I have described certain of the parts as composed of graphite. I wish to have it understood that this term is intended to mean substantially pure carbon, as I have found that commercial so-called graphites that do not consist of pure carbon are not satisfactory for my purpose.

While I have illustrated and described with particularity only a single preferred form of my invention, I do not desire to be limited to the exact details thus illustrated and described, but intend to cover all forms and arrangements that come within the definitions of my invention constituting the appended claim.

I claim:

A motor driven pumping unit containing a narrow, metal, walled pump chamber, two intermeshing pump gears within and having a close fit in said chamber, a short stationary shaft for one of said gears extending across the chamber and into opposed chamber walls, a bearing sleeve composed entirely of graphite between said shaft and gear, a second shaft fixed to the second gear and extending at one end into one of said opposed walls and at its other end through the second of such walls, and bearings also composed entirely of graphite for the second shaft in both of said opposed walls; said bearing sleeve being as long as the thickness of the gears and said bearings for the second shaft engaging the gear on that shaft.

OLIVER MAISCH.

REFERENCES CITED

The following references are of record in the file of this patent:

UNITED STATES PATENTS

| Number | Name | Date |
| --- | --- | --- |
| Re. 6,748 | Lathrop et al. | Nov. 16, 1875 |
| Re. 17,372 | Morris | July 9, 1929 |
| 349,056 | Randolph | Sept. 4, 1886 |
| 877,861 | Radu | Jan. 28, 1908 |
| 1,054,265 | Baekeland | Feb. 25, 1913 |
| 1,132,747 | Sundh | Mar. 23, 1915 |
| 1,288,481 | Bennett | Dec. 24, 1918 |
| 1,300,501 | Sorel | Apr. 15, 1919 |
| 1,682,842 | Hamer | Sept. 4, 1928 |
| 1,785,386 | McIntyre | Dec. 16, 1930 |
| 1,902,347 | Vogt et al. | Mar. 21, 1933 |
| 1,912,737 | Svenson | June 6, 1933 |
| 1,972,632 | Patton | Sept. 4, 1934 |
| 2,046,103 | Austin | June 30, 1936 |
| 2,082,412 | Morton | June 1, 1937 |
| 2,096,490 | Hansen | Oct. 19, 1937 |
| 2,193,273 | Dietzel | Mar. 12, 1940 |
| 2,212,417 | George | Aug. 20, 1940 |
| 2,247,454 | Thomson | July 1, 1941 |
| 2,276,107 | Simons | Mar. 10, 1942 |
| 2,336,294 | Rea | Dec. 7, 1943 |
| 2,361,747 | Curtis et al. | Oct. 31, 1944 |
| 2,398,783 | Gilbert, Sr. | Apr. 23, 1946 |

FOREIGN PATENTS

| Number | Country | Date |
| --- | --- | --- |
| 294,653 | Great Britain | June 6, 1929 |
| 386,105 | Great Britain | Jan. 12, 1933 |

OTHER REFERENCES

National Carbon Company, Inc., Catalogue M-8000-A. October 1944.